(12) United States Patent
Kawanaka

(10) Patent No.: US 7,497,051 B2
(45) Date of Patent: Mar. 3, 2009

(54) PLASTIC-MADE GREENHOUSE

(75) Inventor: Hiroshi Kawanaka, Matsusaka (JP)

(73) Assignee: Gosei Nakagawa SA, Vitoria-Gasteiz (ES)

( * ) Notice: Subject to any disclaimer, the term of this patent is extended or adjusted under 35 U.S.C. 154(b) by 95 days.

(21) Appl. No.: 10/577,883

(22) PCT Filed: Oct. 28, 2003

(86) PCT No.: PCT/ES03/00552

§ 371 (c)(1),
(2), (4) Date: Feb. 20, 2007

(87) PCT Pub. No.: WO2005/039270

PCT Pub. Date: May 6, 2005

(65) Prior Publication Data

US 2007/0157529 A1    Jul. 12, 2007

(51) Int. Cl.
| | |
|---|---|
| *E04B 1/32* | (2006.01) |
| *E04C 2/42* | (2006.01) |
| *E04C 3/02* | (2006.01) |
| *A01G 9/00* | (2006.01) |
| *F16D 1/00* | (2006.01) |
| *A63H 33/06* | (2006.01) |

(52) U.S. Cl. .......................... 52/81.3; 52/80.1; 52/665; 52/695; 403/408.1; 446/120; 47/17

(58) Field of Classification Search ................. 52/79.5, 52/63, 86, 80.1, 81.3, 665, 695, 696; 403/408.1; 446/106, 108, 118, 119, 120, 122, 124
See application file for complete search history.

(56) References Cited

U.S. PATENT DOCUMENTS

| | | | | |
|---|---|---|---|---|
| 768,594 A | * | 8/1904 | Finlay | ......................... 52/690 |
| 1,358,687 A | * | 11/1920 | Lyon | .......................... 293/140 |
| 1,442,582 A | * | 1/1923 | Palmer-Jones | .............. 403/219 |
| 2,060,387 A | * | 11/1936 | Wallis | ........................ 244/119 |

(Continued)

FOREIGN PATENT DOCUMENTS

AU            593403         5/1988

(Continued)

OTHER PUBLICATIONS

International Search Report dated Jan. 27, 2004.

*Primary Examiner*—Richard E Chilcot, Jr.
*Assistant Examiner*—Andrew J Triggs
(74) *Attorney, Agent, or Firm*—Katten Muchin Rosenman LLP

(57) ABSTRACT

It is composed of a framework made up entirely of pieces of recycled plastic that basically comprises bearers (1-2), distributed in several sectors along the whole length of the greenhouse and made up of sections (3-4) that are fitted to one another by means of linear connectors (5) which engage on lugs (12-16) and which are in turn joined by means of cross connectors (8) that engage on lugs (17) provided on horizontal sections (6) making up horizontal cross members (7) which brace the framework forming the roof, side walls, front wall and rear wall of the greenhouse. It includes inner spacer clips (23) and intermediate spacer clips (30) that engage on rods (27-27'-27") securing inner plastic laminar layers (28-28'-28"), between which air chambers are formed that act as thermal insulation for the greenhouse.

9 Claims, 10 Drawing Sheets

U.S. PATENT DOCUMENTS

| | | | | |
|---|---|---|---|---|
| 2,336,228 | A * | 12/1943 | Davey | 52/575 |
| 2,457,593 | A * | 12/1948 | Nelson | 439/817 |
| 2,746,579 | A * | 5/1956 | Gondek | 403/408.1 |
| 3,080,875 | A | 3/1963 | Bartlett | |
| 3,787,130 | A * | 1/1974 | Hemmings et al. | 403/205 |
| 3,968,604 | A * | 7/1976 | Hills | 52/86 |
| 4,070,846 | A * | 1/1978 | Sohlberg | 52/641 |
| 4,091,584 | A | 5/1978 | Brown | |
| 4,136,408 | A | 1/1979 | Dahlbeck et al. | |
| 4,474,493 | A * | 10/1984 | Welch | 403/408.1 |
| 4,567,707 | A | 2/1986 | Herman | |
| 4,682,642 | A | 7/1987 | Hogshead, III et al. | |
| 4,769,877 | A | 9/1988 | Conley | |
| 5,224,320 | A * | 7/1993 | Mai | 52/648.1 |
| 5,241,451 | A * | 8/1993 | Walburn et al. | 361/785 |
| 5,271,202 | A * | 12/1993 | Vukmanic et al. | 52/667 |
| 5,381,634 | A * | 1/1995 | Pietrogrande et al. | 52/86 |
| 5,555,681 | A | 9/1996 | Cawthon | |
| 5,579,623 | A * | 12/1996 | Stark et al. | 52/665 |
| 5,598,668 | A | 2/1997 | Isom | |
| 5,660,002 | A | 8/1997 | Lashinger | |
| 5,697,725 | A * | 12/1997 | Ballash et al. | 403/231 |
| 5,761,871 | A * | 6/1998 | Atake | 52/653.1 |
| 5,964,635 | A * | 10/1999 | Krog | 446/120 |
| 6,045,290 | A * | 4/2000 | Nocievski | 403/231 |
| 6,461,215 | B1 * | 10/2002 | Kunz et al. | 446/107 |
| 6,475,055 | B1 * | 11/2002 | Javer et al. | 446/108 |
| 6,502,593 | B1 * | 1/2003 | Stafford | 135/115 |
| 7,128,493 | B2 * | 10/2006 | Alarcon-Lopez | 403/322.1 |
| 7,143,550 | B1 * | 12/2006 | Lopez | 52/81.3 |
| 2002/0059749 | A1 | 5/2002 | Williams et al. | |

FOREIGN PATENT DOCUMENTS

| | | |
|---|---|---|
| ES | 351915 | 12/1969 |
| ES | 1 001 213 | 4/1988 |
| ES | 1 001 413 | 5/1988 |
| GB | 1 384 872 | 2/1975 |
| JP | 6-125662 | 5/1994 |
| JP | 2001-204268 | 7/2001 |
| RU | 2 195 810 | 1/2003 |
| WO | WO 99/53744 | 10/1999 |

* cited by examiner

A-A

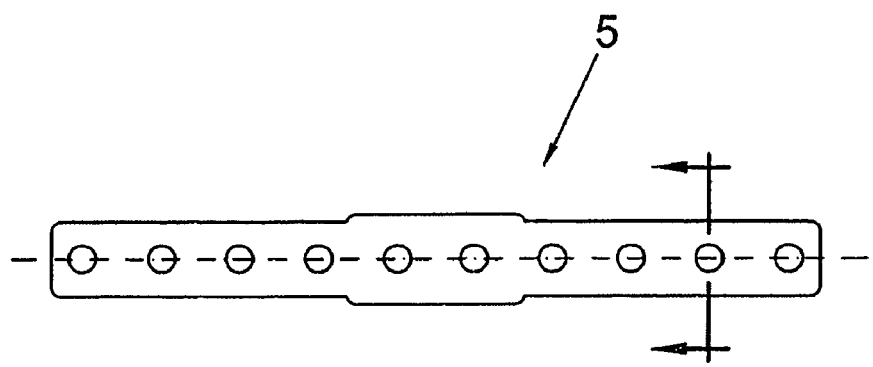
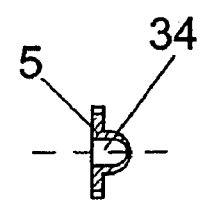
FIG. 11  FIG. 12
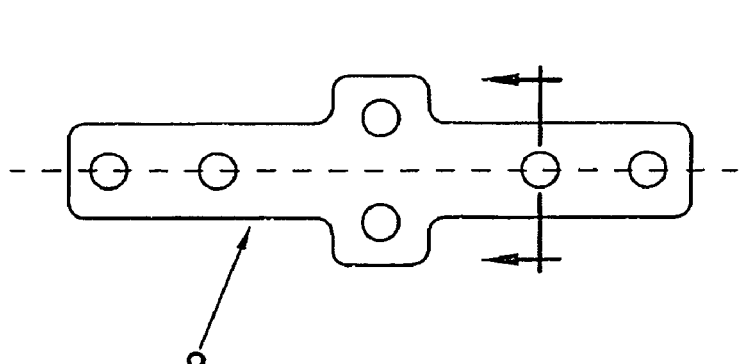
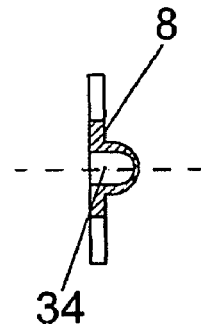
FIG. 13  FIG. 14

PLASTIC-MADE GREENHOUSE

This application is the National Stage of International Application No. PCT/ES2003/000552, filed Oct. 28, 2003, which is herein incorporated by reference.

OBJECT OF THE INVENTION

The present invention refers to a greenhouse consisting of a series of pieces of recycled plastic material which are assembled to one another.

The object of the invention is that the framework should be made up of curved and vertical bearers formed of sections with lugs that are joined together by means of linear connectors, and horizontal cross members formed of sections perpendicular to the previous ones with lugs that are coupled to the bearer sections by means of cross connectors.

The object of the invention also includes providing connecting means that assure the attachment of a plastic outer shell and of various plastic inner layers forming the air chambers that help to maintain the temperature of the greenhouse, as well as inner layers that may consist of filters which prevent the passage of ultraviolet rays.

BACKGROUND OF THE INVENTION

Conventional greenhouses are normally made up of metal frameworks on which vinyl sheets joined together by means of rubber or plastic belts are mounted.

A problem common to all these greenhouses is the rusting of the metal framework, which leads to significant deterioration of the structure and its support conditions with time and its eventual collapse.

Modular structures have been designed made up of side members consisting of half-round rods and horizontal cross members, which are attached at their intersection points to form a framework that is covered with a laminar plastic casing that constitutes the shell of the greenhouse. In this case the side members and cross members are made of metallic material, which means that the framework is subject to the deterioration caused by the rusting of these elements.

There are greenhouses intended for growing flowers in their interior, consisting of aluminium tubes and glass, which are more resistant to corrosion, although they certainly prove expensive.

Structures of this type, conventionally used to maintain environmental conditions, particularly when it comes to sheltering the crops housed inside from the cold, require the provision of a suitable system of framework insulation and sealing. It is a question of preventing the thermal differences that are detrimental to the crops, especially sharp changes between night and daytime temperatures.

Some of the structures designed for use as greenhouses also take the form of awnings that are used for performing such different functions as forming an enclosure for a heated swimming-pool or a garage for vehicles.

The problems that affect greenhouses also apply to awnings of this type, but in any case they are amenable to solution by means of the invention described here.

DESCRIPTION OF THE INVENTION

The plastic greenhouse which is the object of this invention offers a satisfactory solution to the problems described inasmuch as it is not affected by corrosion on account of its plastic nature, while it forms a sturdy structure with connecting means that strengthen the framework. Furthermore, this greenhouse facilitates the possible installation of various laminar layers of plastic between which the air chambers are formed that make up the thermal insulation of the greenhouse.

The greenhouse is basically composed of bearers that are distributed in several sections along the whole length of the greenhouse and which are joined to one another and to horizontal cross members by a coupling system using connectors engaged on lugs protruding from the surfaces of the bearers and cross members.

The bearers may be vertical, in which case they will be used to form the front and rear walls of the greenhouse when the framework of the greenhouse includes these walls, while they are also used for the type of greenhouse layout which has vertical side walls topped by a curving roof.

The bearers may be curved and form the roof frame and side walls of a partly round section greenhouse, without the need to include vertical uprights, being arranged in suitably curved sections so that, when joined together, they define the curvature of the bearer and, therefore, the framework of the greenhouse.

The bearers are arranged in sections which have a front and rear side linked by bracing ribs, and adjacent to the end edges on the front and rear sides they have end lugs aligned with those corresponding to the next section on which a linear fastening piece forming the connection between sections is press-fitted.

In order to achieve perfect alignment in the connection between sections, on their end edges they have respective half lugs which together with the half lug of the next section make up a complete lug on which is fitted a fastening cap that corrects the possible misalignment between sections by fixing the coupling position between consecutive sections.

The middle sectors of the sections are fitted with intermediate lugs protruding from the front and rear faces provided with cross connectors that attach the sections to horizontal sections forming the horizontal cross members of the greenhouse.

These horizontal sections also consist of a front and rear face joined by bracing ribs with lugs located on these faces adjacent to their edges.

The horizontal cross members at the base of the greenhouse rest on the ground and are attached by means of respective clips or hooks encircling them or some element ancillary to the cross members.

There is a possibility of including a plastic outer shell that rests on the front side of the uprights and cross members forming the framework and plastic inner laminar layers between which the air chambers are formed that contribute to the thermal insulation of the greenhouse, besides incorporating an inner ultraviolet ray filtering laminar layer.

If provided with a single plastic inner shell, it is attached to the rear side of the uprights with clamps. If another plastic inner layer is fitted besides the plastic inner shell, then inner spacer clips are employed as an alternative supplementary to the use of the clamps to attach the inner shell to the uprights, while the spacer clips are coupled by one of their ends to the rear side of the upright, from which it extends perpendicularly until terminating at its other end, which is coupled to a round rod which extends for the same length as that of the section of the upright and parallel thereto, it being foreseen that the first laminar layer should encircle the rod and that it should be fastened by an intermediate spacer clip that will act as the spacer for the next laminar layer.

The intermediate spacer clip consists of an elongated piece that fits at one end onto the rod described above, securing the first laminar layer, and at the other end into another rod, which is encircled by a second laminar layer. The space defined by the length of the clips between laminar layers determines the width of the air chamber.

This same spacer clip-rod-laminar layer arrangement is repeated accordingly in the direction of the inside of the greenhouse depending on the number of plastic laminar layers that it is intended to fit, while the last plastic laminar layer is attached to its rod by means of a clamp.

DESCRIPTION OF THE DRAWINGS

To supplement the description that is being given and in order to facilitate a better understanding of the features of the invention, in accordance with a preferred example of practical embodiment of same, this description is accompanied, as an integral part thereof, by a set of drawings a set of drawings wherein is represented, for purely illustrative and non-restrictive purposes, the following:

FIG. 11.- It shows a plan view of a linear connecting piece.

FIG. 12.- It shows a side view of a linear connector.

FIG. 13.- It shows a plan view of a cross connector.

FIG. 14,- It shows a side view of a cross connector.

PREFERED EMBODIMENT OF THE INVENTION

Figure 1:
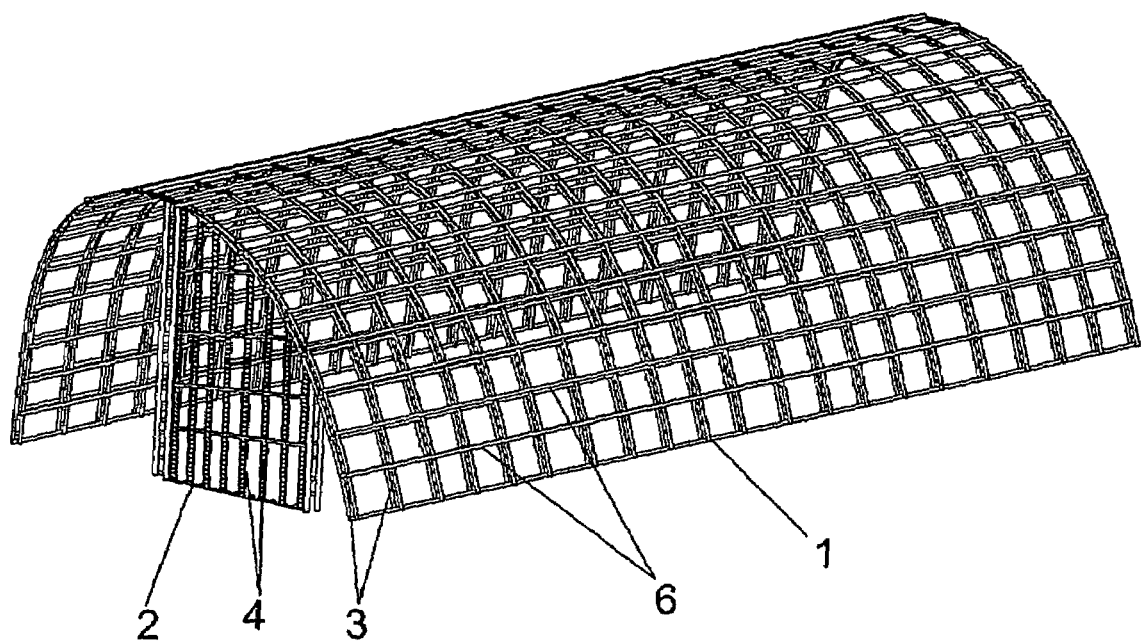
FIG. 1.- It shows a perspective view of the partially round section greenhouse composed of a plastic framework using curved uprights and horizontal cross members, with flat uprights used to form the front and rear walls of the greenhouse.
Figure 2:
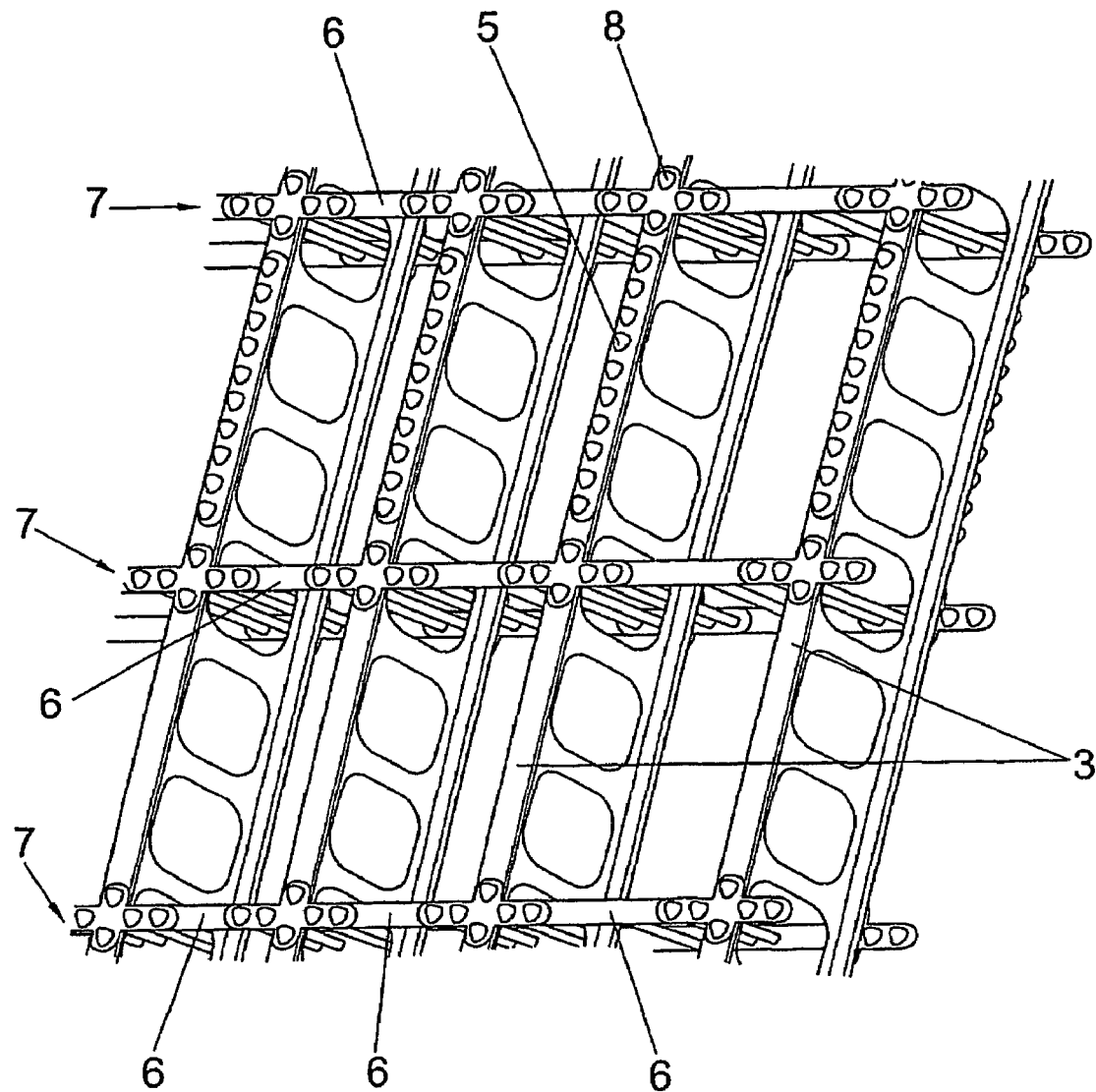
FIG. 2.- It shows a perspective view of a detail of the curved sections forming the curved uprights and the cross members of the framework appropriately coupled by means of connectors.
Figure 3:
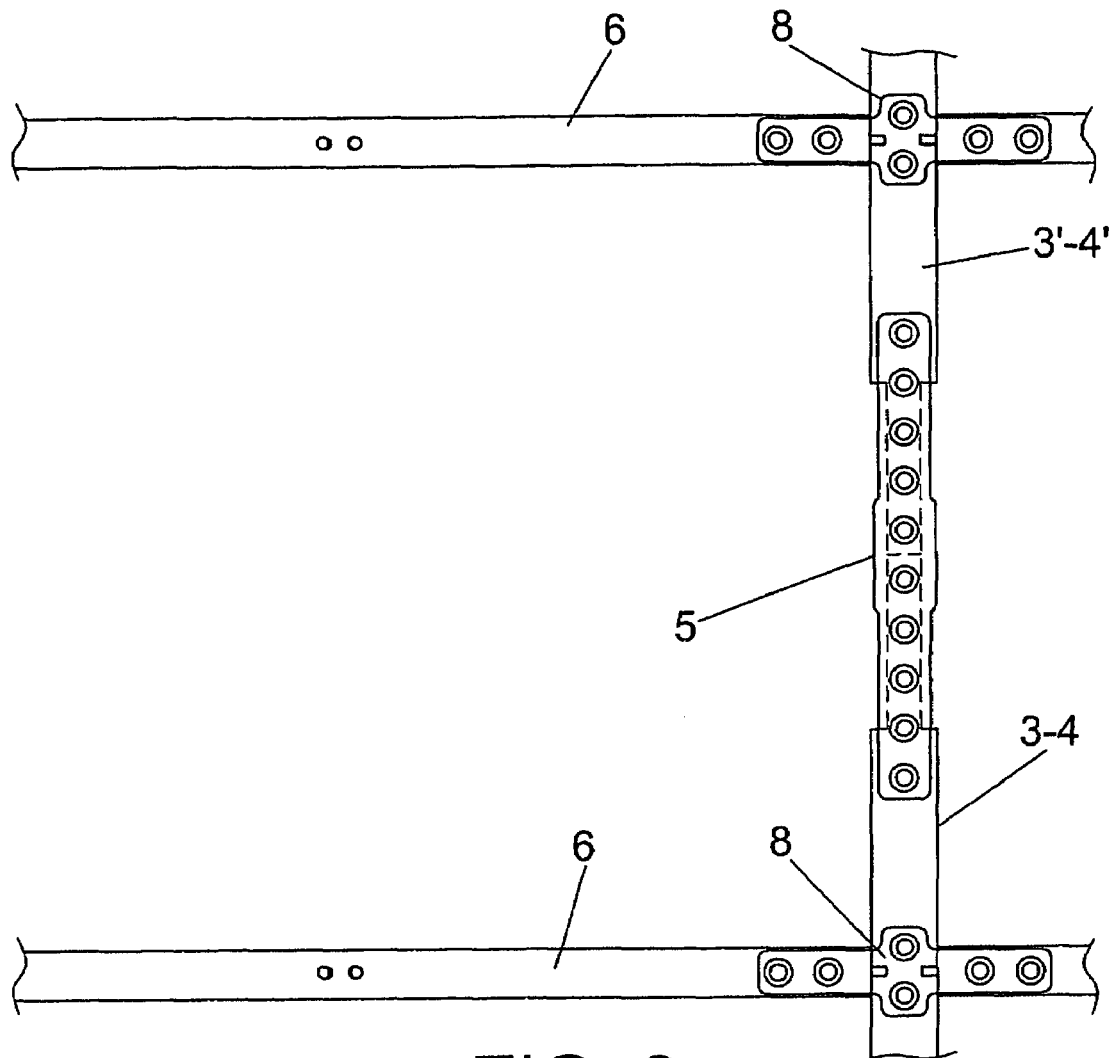
FIG. 3.- It shows an elevational view of the connection between sections of an upright and the horizontal sections of the cross members.
Figure 4:
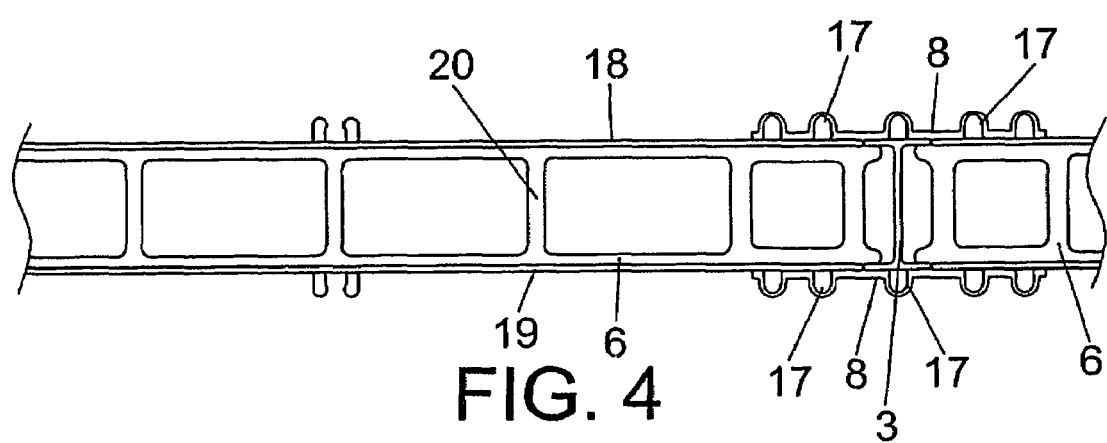
FIG. 4.- It shows a plan view referring to the arrangement described in the previous figure.
Figure 5:
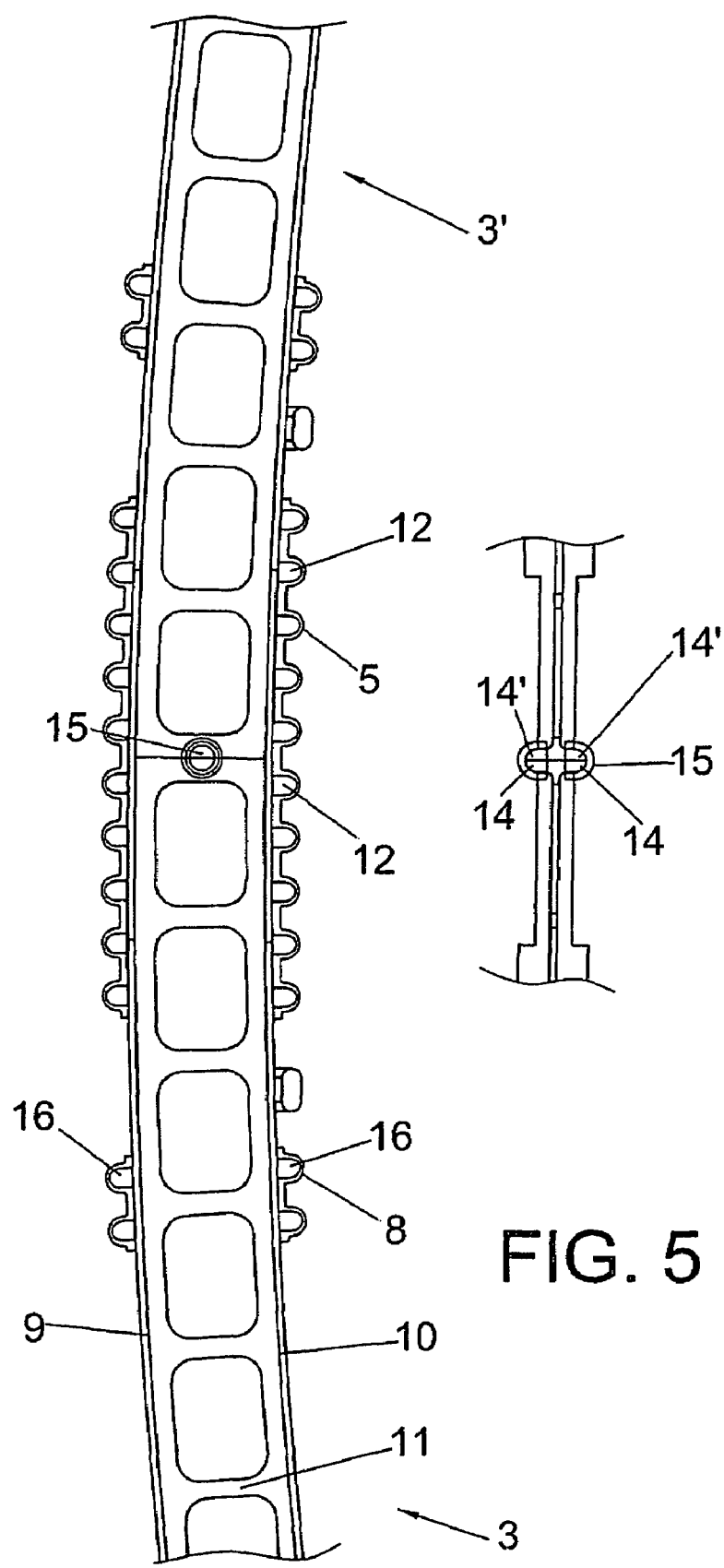
FIG. 5.- It shows a side view referring to the arrangement described in the previous two figures showing the connection between curved sections of the curved upright and a close view of its coupling.
Figure 6:
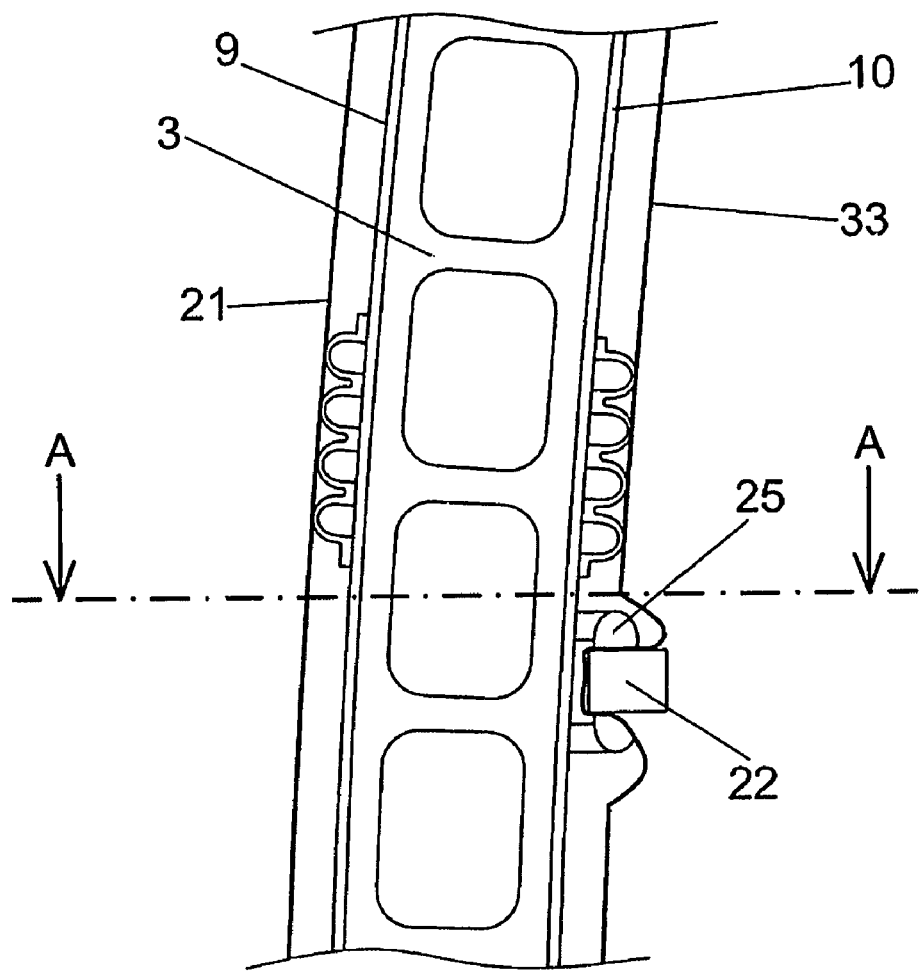
FIG. 6.- It shows a side view matching the previous figure in which we may see a curved section clad with a plastic outer shell and a plastic inner shell attached by means of damps to elongated protuberances projecting from the rear side of the curved section.
Figure 7:
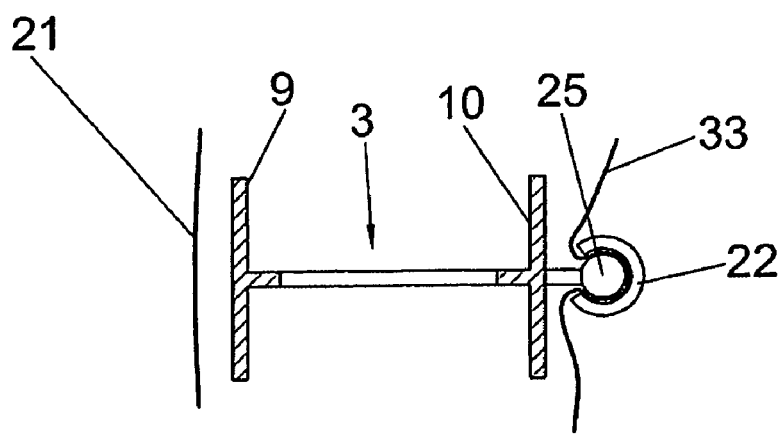
FIG. 7.- It shows a sectional view according to A-A of the previous figure.
Figure 8:
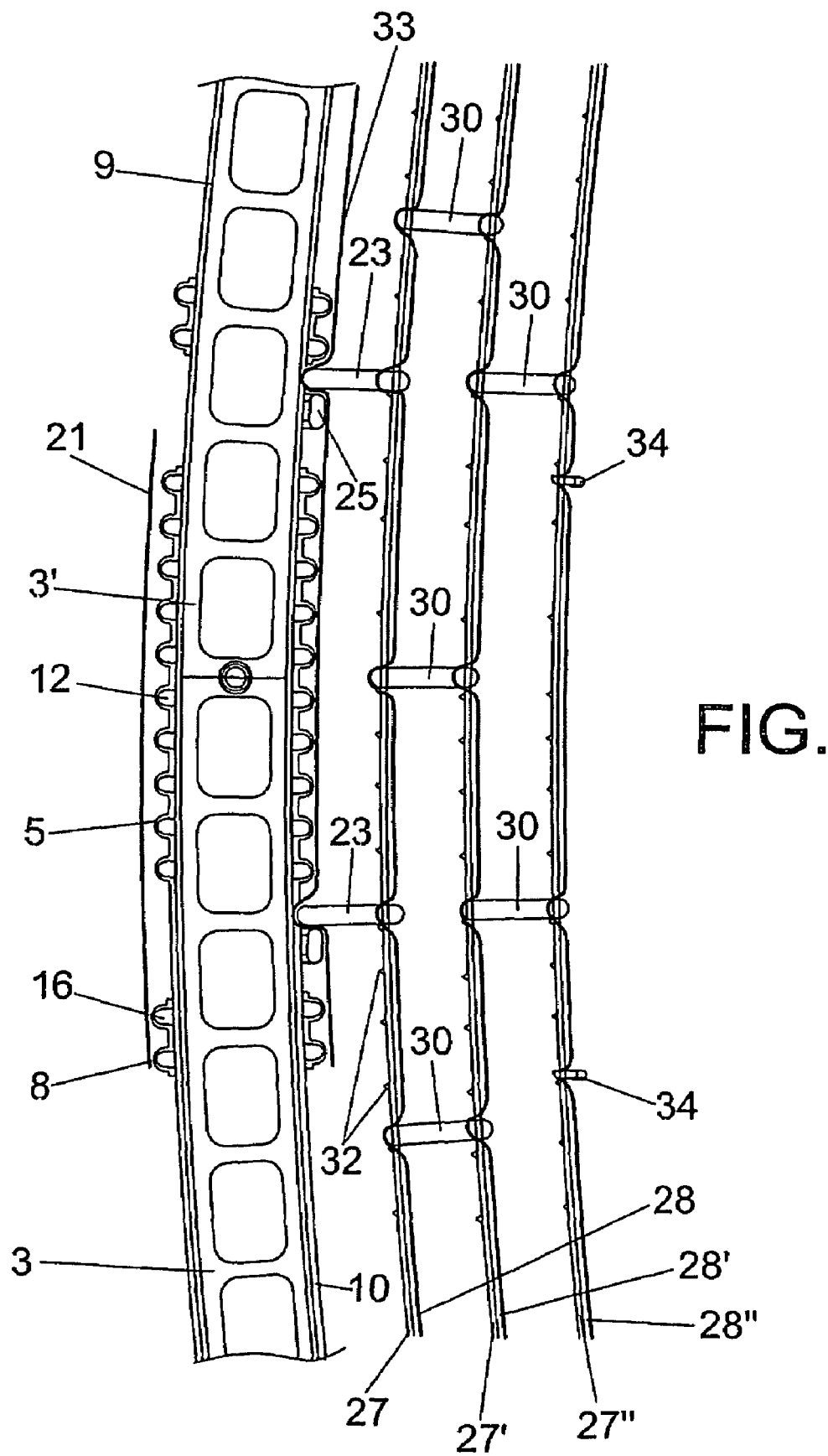
FIG. 8.- It shows a side view referring to the installation of a plastic outer shell, a plastic inner shell and various plastic inner laminar layers on a curved upright.
Figure 9:
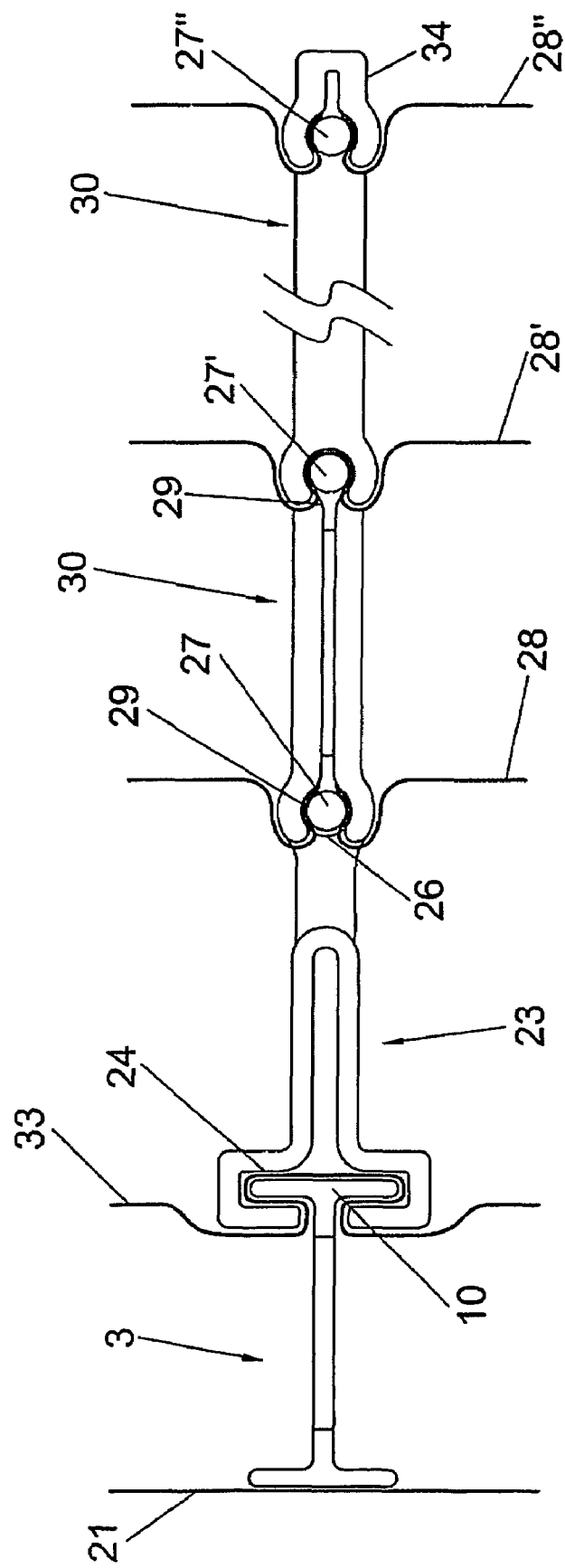
FIG. 9.- It shows a plan view of the arrangement described in the previous figure.
Figure 10:
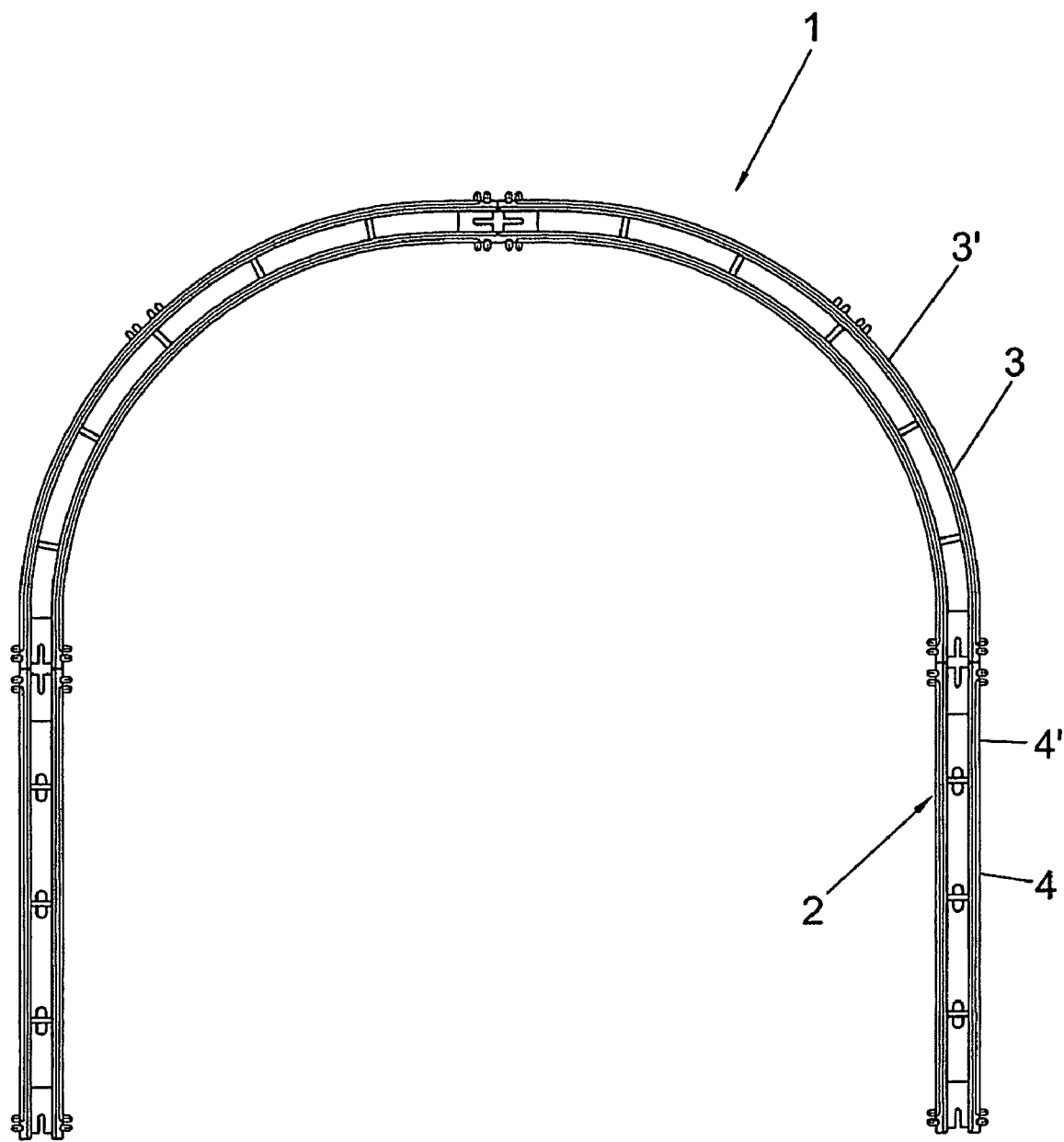
FIG. 10.- It shows a side view of a greenhouse provided with vertical uprights topped by a roof formed of curved struts.
Figure 15:
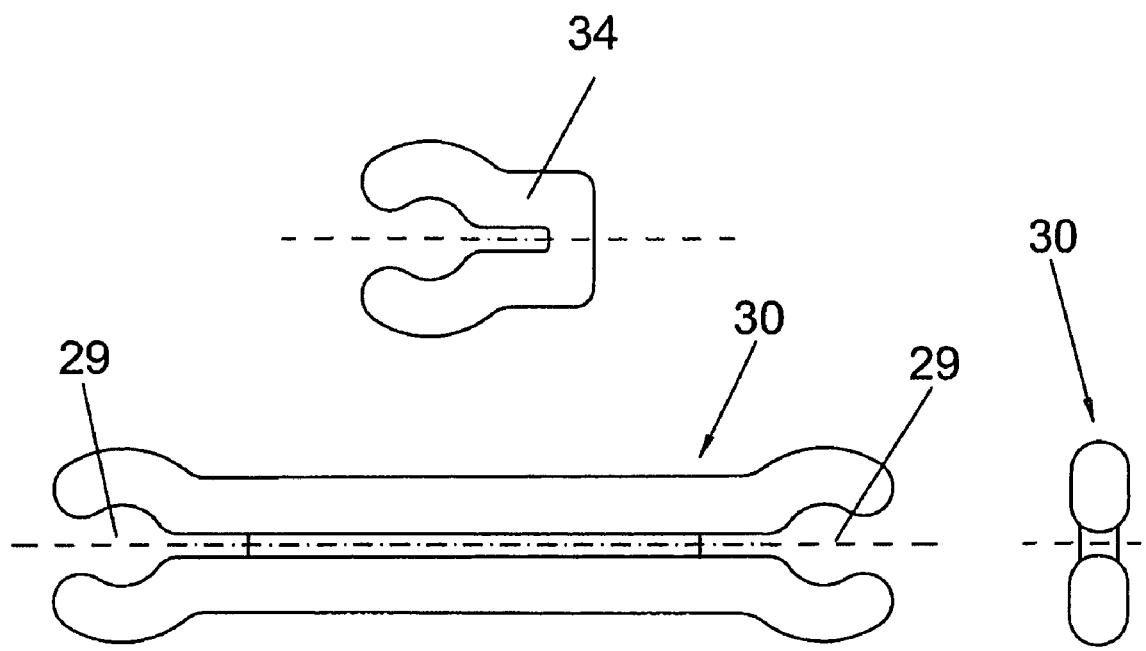
FIG. 15.- It shows a plan view of the intermediate spacer clip.
Figure 16:
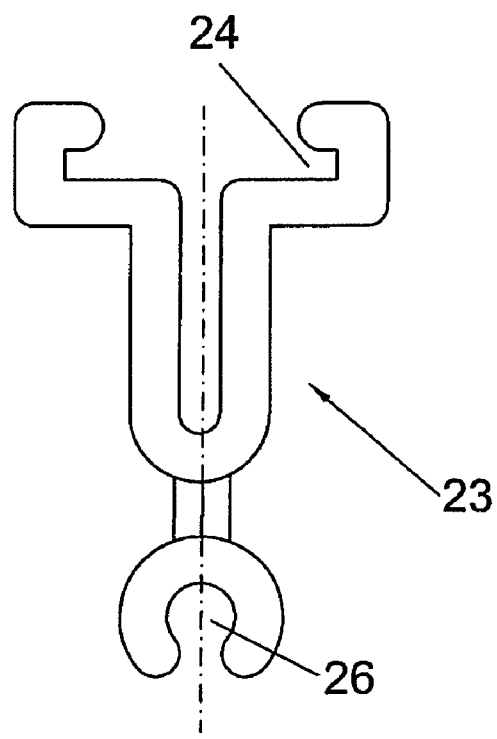
FIG. 16.- It shows a plan view of the inner spacer clip.

The plastic greenhouse that is the object of this invention is primarily noteworthy in that it is made up of a framework, formed wholly of recycled plastic pieces, which basically comprises bearers distributed in various sectors along the whole length of the greenhouse, consisting of curved struts (1) for roof and side wall and optionally a combination of curved struts (1) for roof and vertical uprights (2) for side wall composed of curved sections (3) and vertical sections (4), respectively, which are fitted to one another by means of linear connectors (5) and which in turn are also attached by cross connectors (8) to horizontal sections (6), forming horizontal cross members (7), that brace the framework making up the roof and side walls, while It Is foreseen that the greenhouse front and rear wall bearers should be vertical uprights (2).

Like the vertical sections (2) the curved sections (3) have a front side (9) and a rear side (10) linked by bracing ribs (11) fitted with lugs (12) arranged in a line at their top and bottom edges, respectively, on which is press-fitted the linear connector (5) that establishes the coupling between consecutive curved sections (3-3') or consecutive vertical sections (4-4'), each section (3), (4) being provided at its end edges with a half lug (14) which is connected to the other half lug (14') of the next section (3'),(4') to form a whole lug, on which a fastening cap (15) is fitted to assure fastening and collinearity between consecutive curved sections (3-3') or consecutive vertical sections (4-4').

Similarly, the front side (9) and rear side (10) of the curved sections (3) and the vertical section (4) are provided with intermediate lugs (16) on which are fitted the cross connectors (8) that also engage on lugs (17) situated adjacent to the side edges of a front face (18) and of a rear face (19) of the horizontal sections (6), linked by bracing ribs (20), with the result that the coupling is established between the horizontal sections (6) and the curved section (3) or the vertical section (4).

The linear connector (5) and the cross connector (8) have inner recesses (34) for engaging on the lugs (12) of the curved section (3) and vertical section (4), and on the lugs (16) of the curved section (3) and vertical section (4) and lugs (17) of the horizontal section (6), respectively.

The greenhouse is provided with a plastic outer shell (21) which may be fixed onto the front side (9) of the curved sections (3) and vertical sections (4).

The greenhouse may also be provided with a plastic inner shell (33) which can be fixed on the rear side (10) of the curved sections (3) and vertical sections (4) by means of clamps (22) consisting of open rings that fit on elongated protuberances (25) defined on the rear side (10), securing the plastic inner shell (33) between the two.

If the greenhouse has plastic inner laminar layers in addition to the plastic inner shell (33), then inner spacer clips (23) are used that have a rear open rectangular groove (24) that engages with the rear side (10), clamping the plastic inner shell (33), and rests on the elongated protuberances (25), said inner spacer clip (23) extending perpendicularly until it ends up in a partly round groove (26) which engages with a first round rod (27) in which there is housed a first plastic laminar layer (28) that is parallel to and at a constant distance away from the rear side (10).

If the greenhouse is provided with additional plastic laminar layers, the first round rod (27) is encircled by the first laminar layer (28) on which there is an intermediate spacer clip (30) attached that engages by means of a partly round groove (29), from which it extends in elongated form to its other end, where there is another partly round groove (29'), which engages with a second rod (27') encircled by another laminar layer (28'), so that an air chamber is formed between the two laminar layers (28-28').

The second laminar layer (28') is attached to the second rod (27') by means of a clamp (34) or else by means of another intermediate spacer clip (30) if other additional laminar layers are extended with their respective rods. In any case, the clamp (34) will be the means of attachment to the innermost rod (27") and laminar layer (28").

The rods (27-27'-27") are provided along their whole length with perpendicular ridges (32) that act as supports for the inner spacer clips (23), for the intermediate spacer clips (35) and for the clamps (34) when they are coupled to the rods (27-27'-27").

The invention claimed is:

1. Plastic greenhouse of the type that is composed of a framework that has a roof, side walls and optionally a front wall and a rear wall, which comprises: curved struts (1) formed by curved sections (3) which make up the roof and, the side walls in one possible embodiment, vertical uprights (2) formed by vertical sections (4) which make up the front wall, the rear wall and, the side walls in another possible embodiment, horizontal cross members (7) formed by horizontal sections (6) linear connectors (5) which fit together the curved sections (3) and/or the vertical sections (4), cross connectors (8) which fit together the curved sections (3) or the vertical sections (4) and the horizontal sections (6), characterised in that the horizontal sections (6) comprise a front side (18) and a rear side (19) attached by bracing ribs (20) provided with a series of lugs (17) adjacent to the side edges, also the curved sections (3) and vertical sections (4) comprise a front side (9) and a rear side (10) Linked by bracing ribs (11) on which there are lugs (12), arranged in a line adjoining the top and bottom edges respectively, on which is press-fitted the linear connector (5) that establishes the coupling between consecutive curved sections (3) and/or vertical sections (4), additionally the curved sections (3) and the vertical sections (4) are provided at their end edges with a half lug (14) that, along with the other half lug (14') of the consecutive curved section forms a whole lug, on which a fastening cap (15) is fitted to assure fastening and collinearity between consecutive curved sections (3) and/or vertical sections (4) and also in that the front side (9) and the rear side (10) of the curved sections (3) and the vertical sections (4) are provided with intermediate lugs (16) on which are fitted the cross connectors (8), which also engage on the lugs (17) of the horizontal section (6), establishing the fastening between the curved sections (3) or the vertical sections (4) and the horizontal sections (6).

2. Plastic greenhouse according to claim 1 characterised in that it includes a plastic outer shell (21) on the front side (9) of the curved sections (3) and of the vertical sections (4).

3. Plastic greenhouse according to claim 1 characterised in that it includes a plastic inner shell (33) that is fixed on the rear side (10) of the curved sections (3) and vertical sections (4) by means of clamps (22) consisting of open rings that engage on elongated protuberances (25) defined on the rear side (10), securing the plastic inner shell (33) between the two.

4. Plastic greenhouse according to claim 1 characterised in that it includes inner spacer clips (23) that have an open rectangular groove (24) that engages with the rear side (10) of the curved section (3) or vertical section (4), thereby securing the plastic inner shell (33), and rests on the elongated protuberances (25), said inner spacer clip (23) extending perpendicularly until it ends up in a partly round groove (26) into which there fits a first round rod (27) that houses a first plastic laminar layer (28) which is parallel to and at a constant distance away from the plastic inner shell (33), so that an air chamber is formed between the two.

5. Plastic greenhouse according to claim 1 characterised in that it includes an intermediate spacer clip (30) that fits on the round rod (27) encircling the laminar layer (28) by means of a partly round groove (29), from which the elongated intermediate clip (30) extends as far as its other end at which it is provided with another partly round groove (26) that engages with another rod (27') encircled by another laminar layer (28'), there being then installed other intermediate clips (30) that separate the innermost rod (27") and laminar layer (28").

6. Plastic greenhouse according to claim 1 characterised in that it includes a clamp (22)that engages on the innermost rod (27") and fastens the innermost laminar layer (28").

7. Plastic greenhouse according to claim 4 characterised in that the rods (27-27'-27") have perpendicular ridges (32) along their whole length acting as supports for the inner spacer clips (23), for the intermediate spacer clips (35) and for the clamps (22).

8. Plastic greenhouse according to claim 1 characterised in that the linear connector (5) is provided with inner recesses (34) for engaging on the curved section (3) and vertical section (4) lugs (12).

9. Plastic greenhouse according to claim 1 characterised in that the cross connector (8) is provided with inner recesses (34) for engaging on the curved section (3) and vertical section (4) intermediate lugs (16), and on the horizontal section (6) lugs (17).

* * * * *